US012804374B2

(12) United States Patent
Keller et al.

(10) Patent No.: US 12,804,374 B2
(45) Date of Patent: Nov. 17, 2026

(54) RVAS NETWORK FUNCTION FOR HPLMN

(71) Applicant: Telefonaktiebolaget LM Ericsson (publ), Stockholm (SE)

(72) Inventors: Ralf Keller, Würselen (DE); George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 433 days.

(21) Appl. No.: 18/272,817

(22) PCT Filed: Jan. 24, 2022

(86) PCT No.: PCT/IB2022/050601
§ 371 (c)(1),
(2) Date: Jul. 18, 2023

(87) PCT Pub. No.: WO2022/157734
PCT Pub. Date: Jul. 28, 2022

(65) Prior Publication Data
US 2024/0080651 A1 Mar. 7, 2024

Related U.S. Application Data

(60) Provisional application No. 63/140,619, filed on Jan. 22, 2021.

(51) Int. Cl.
*H04W 8/06* (2009.01)
*H04W 48/16* (2009.01)
*H04W 84/04* (2009.01)

(52) U.S. Cl.
CPC ............. *H04W 8/06* (2013.01); *H04W 48/16* (2013.01); *H04W 84/042* (2013.01)

(58) Field of Classification Search
CPC ............................ H04W 48/16; H04W 84/042
See application file for complete search history.

(56) References Cited

U.S. PATENT DOCUMENTS

2003/0226033 A1* 12/2003 Zinda .................... H04L 63/101 713/170
2004/0072555 A1* 4/2004 Grech .................. H04Q 3/0045 455/433

(Continued)

FOREIGN PATENT DOCUMENTS

WO 2020217224 A1 10/2020
WO 2022238910 A1 11/2022

OTHER PUBLICATIONS

Author Unknown, "Technical Specification Group Services and System Aspects; System architecture for the 5G System (5GS); Stage 2 (Release 16)," Technical Specification 23.501, Version 16.7.0, Dec. 2020, 3GPP Organizational Partners, 450 pages.

(Continued)

*Primary Examiner* — Fabricio R Murillo Garcia
(74) *Attorney, Agent, or Firm* — Sonoda & Kobayashi Intellectual Property Law; Sarvajit S. Patil

(57) ABSTRACT

Providing Roaming Value Added Service (RVAS) network function for Home Public Land Mobile Network (HPLMN) is disclosed herein. In some embodiments, a Home Network Repository Function (H-NRF) in an HPLMN of a telecommunications network obtains information about a Home Control Network Function (NF) and a Roaming Control NF. A Visited NF in a Visited Public Land Mobile Network (VPLMN) sends a discovery request to the H-NRF in the HPLMN. The H-NRF receives the discovery request from the Visited NF in the VPLMN, and determines that, for the discovery request and the VPLMN, RVAS is applicable. The H-NRF selects the Roaming Control NF and the Home Control NF for the discovery request, and transmits, to the Visited NF, a response to the discovery request, the response comprising an address of the selected Roaming Control NF instead of an address of the selected Home Control NF.

3 Claims, 18 Drawing Sheets

(56) References Cited

U.S. PATENT DOCUMENTS

| | | | | |
|---|---|---|---|---|
| 2019/0268835 | A1* | 8/2019 | Shan | H04W 48/16 |
| 2020/0145538 | A1* | 5/2020 | Qiao | H04M 15/85 |
| 2020/0280837 | A1* | 9/2020 | Vaishnavi | H04W 8/06 |
| 2020/0367148 | A1* | 11/2020 | Baek | H04W 48/18 |
| 2021/0368427 | A1* | 11/2021 | Rommer | H04W 76/00 |
| 2022/0225074 | A1* | 7/2022 | Sama | H04W 8/12 |

OTHER PUBLICATIONS

Author Unknown, "Technical Specification Group Services and System Aspects; Procedures for the 5G System (5GS); Stage 2 (Release 16)," Technical Specification 23.502, Version 16.7.1, Jan. 2021, 3GPP Organizational Partners, 603 pages.

Verwimp, et al., "5G Mobile Roaming Revisited (5GMRR)," Status of RVAS role and services, Dec. 17, 2020, GSMA, 9 pages.

International Search Report and Written Opinion for International Patent Application No. PCT/IB2022/050601, mailed Jun. 15, 2022, 19 pages.

* cited by examiner

RVAS NETWORK FUNCTION FOR HPLMN

RELATED APPLICATIONS

This application is a 35 U.S.C. § 371 national phase filing of International Application No. PCT/IB2022/050601, filed Jan. 24, 2022, which claims the benefit of provisional patent application Ser. No. 63/140,619, filed Jan. 22, 2021, the disclosures of which are incorporated herein by reference in their entireties.

TECHNICAL FIELD

The present disclosure relates to the provision of Roaming Value Added Services (RVAS) in a cellular communication system.

BACKGROUND

A Security Edge Protection Proxy (SEPP) is a control plane entity at the edge of an operator network. As illustrated in FIG. 1, SEPP is used to authenticate and protect incoming and outgoing control plane traffic over the interconnect between a Home Public Land Mobile Network (HPLMN) and a Visited Public Land Mobile Network (VPLMN). In addition, the use of SEPP can provide topology hiding with respect to the HPLMN.

A SEPP authenticates using Transport Layer Security (TLS) over N32-c (i.e., the N32 interface control plane). Additionally, an SEPP protects messages over N32-f (i.e., the N32 interface data plane), either using TLS or the Protocol for N32 Interconnect Security (PRINS). Note that the Global Systems for Mobile Communications (GSM) Association (GSMA) has decided to avoid the use of PRINS, and discussions are ongoing at this time regarding how to provide Roaming Value Added Services (RVAS) when not using PRINS.

FIGS. 2 and 3 illustrate exemplary uses of TLS to provide inter-Public Land Mobile Network (PLMN) security in Fifth Generation (5G) telecommunication networks. As seen in FIG. 2, TLS is used to encrypt N32-f between a consumer SEPP (cSEPP) and a producer SEPP (pSEPP). Each of the cSEPP and pSEPP must have the credentials of the roaming partner's SEPP. Referring now to FIG. 3, each Internet Protocol (IP) Exchange (IPX) between the pSEPP and the cSEPP may employ a Hypertext Transfer Protocol (HTTP) proxy. The HTTP proxy can modify information elements (IEs) inside each HTTP request and response message by adding a Javascript Object Notation (JSON) patch modification. Each PLMN must agree on a modification policy with the IPX provider with which it has a relationship prior to establishment of an N32 connection. In addition, each SEPP must have a TLS certificates of the peer SEPP to establish an N32-C connection, and must also have the public keys of both a consumer IPX (cIPX) and a producer IPX (pIPX) to verify the signatures of the JSON patch modifications. The symmetric key A of FIG. 3 may be derived from the N32-c TLS connection.

As used herein, the terms "Roaming Value Added Services" or "RVAS" encompass a set of business services provided to a PLMN operator. This set of business services may include services provided to a subscriber (e.g., roaming control service or roaming welcome Short Message Service (SMS), as non-limiting examples) or to the PLMN (e.g., to solve interoperability issues or take corrective actions, as non-limiting examples). RVAS are optional for mobile network operators (MNOs). A "RVAS provider," as that term is used herein, is an external entity, acting outside the perimeter of an MNO's network domain, that provides RVAS to an MNO. Table 1 below illustrates exemplary RVAS that are relevant to the present disclosure:

TABLE 1

| Service | Descrip-tion | Target | Third Generation (3 G) or Fourth Generation (4 G) Operation | Outlook for 5 G |
|---|---|---|---|---|
| SRC | Data Roaming Control | Outbound roamers | Control Plane (CP) and User Plane (UP), management of data plans and data sessions of outbound roamers | New use cases expected: low latency alternatives for Local Break Out (LBO); private networks |
| Dual Inter-national Mobile Subscriber Identity (IMSI) | Sponsored Roaming | Outbound roamers | Sponsor | New use cases expected: private networks; greenfields; fast-track 5 G roaming |

SUMMARY

Methods and apparatus are disclosed herein for providing Roaming Value Added Service (RVAS) network function for Home Public Land Mobile Network (HPLMN). Embodiments of a method for providing RVAS are disclosed herein. The method comprises, at a Home Network Repository Function (H-NRF) in an HPLMN of a telecommunications network, obtaining information about a Home Control Network Function (NF) and a Roaming Control NF. The method further comprises, at a Visited NF in a Visited Public Land Mobile Network (VPLMN) sending a discovery request to the H-NRF in the HPLMN. The method also comprises, at the H-NRF, receiving the discovery request from the Visited NF in the VPLMN. The method additionally comprises determining that, for the discovery request and the VPLMN, RVAS is applicable. The method further comprises, in response to the determining, selecting the Roaming Control NF and the Home Control NF for the discovery request, and transmitting, to the Visited NF, a response to the discovery request, the response comprising an address of the selected Roaming Control NF instead of an address of the selected Home Control NF. The method also comprises, at the Visited NF receiving the response to the discovery request from the H-NRF.

According to some embodiments disclosed herein, the method further comprises, at the H-NRF, sending, to the Roaming Control NF, a notification comprising an address of the selected Home Control NF. The method also comprises, at the Roaming Control NF, storing the address of the Home Control NF. In some embodiments disclosed herein, the Roaming Control NF comprises an RVAS Session Management Function (R-SMF), and the Home Control NF comprises a Home Session Management Function (H-SMF). In some such embodiments, the method further comprises, at the Roaming Control NF, receiving, from a Visited Session Management Function (V-SMF) in the VPLMN, a Protocol Data Unit (PDU) session create request to setup a PDU session. The method also comprises obtaining the Home Control NF for the PDU session, and sending the PDU session create request to the Home Control NF.

Some embodiments disclosed herein provide that obtaining the Home Control NF comprises sending, by the Roaming Control NF, to the H-NRF a discovery message comprising an RVAS Identifier (RVAS-ID) of an RVAS operator of the HPLMN for discovering an H-SMF. In such embodiments, the method further comprises, at the H-NRF, determining, based on an RVAS-ID of an RVAS operator of the HPLMN, the home control NF, and returning the home control NF to the Roaming Control NF. According to some embodiments disclosed herein, obtaining the Home Control NF is based on the stored address of the Home Control NF.

Embodiments of a method performed by a network node implementing an H-NRF in an HPLMN of a telecommunications network for providing RVAS are also disclosed herein. The method comprises obtaining information about a Home Control NF and a Roaming Control NF. The method further comprises receiving a discovery request from a Visited NF in a VPLMN, and determining that, for the discovery request and the VPLMN, RVAS is applicable. The method also comprises, in response to the determining, selecting the Roaming Control NF and the Home Control NF for the discovery request, and transmitting, to the Visited NF, a response to the discovery request, the response comprising an address of the selected Roaming Control NF instead of an address of the selected Home Control NF.

In some embodiments disclosed herein, the Home Control NF comprises an H-SMF, and the Roaming Control NF comprises an R-SMF. Some such embodiments disclosed herein provide that the method further comprises informing the R-SMF of the discovery request including the selected H-SMF. According to some embodiments disclosed herein, the Home Control NF comprises a Home Policy Control Function (H-PCF), and the Roaming Control NF comprises an RVAS Policy Control Function (R-PCF). In some such embodiments disclosed herein, the method further comprises informing the R-PCF of the discovery request including the selected H-PCF.

Embodiments of a network node implementing an H-NRF in an HPLMN of a telecommunications network for providing RVAS are also disclosed herein. Some embodiments disclosed herein provide that the network node comprises a network interface, processing circuitry associated with the network interface. The processing circuitry is configured to cause the network node to obtain information about a Home Control NF and a Roaming Control NF, and receive a discovery request from a Visited NF in a VPLMN. The processing circuitry is further configured to cause the network node to determine that, for the discovery request and the VPLMN, RVAS is applicable. The processing circuitry is also configured to cause the network node to, in response to the determining, select the Roaming Control NF and the Home Control NF for the discovery request, and transmit, to the Visited NF, a response to the discovery request, the response comprising an address of the selected Roaming Control NF instead of an address of the selected Home Control NF. According to some embodiments disclosed herein, the processing circuitry is additionally configured to cause the network node to perform the steps of any of the above-disclosed methods attributed to the network node.

Embodiments of a network node implementing an H-NRF in an HPLMN of a telecommunications network for providing RVAS are also disclosed herein. In some such embodiments disclosed herein, the network node is adapted to obtain information about a Home Control NF and a Roaming Control NF, and receive a discovery request from a Visited NF in a VPLMN. The network node is further adapted to determine that, for the discovery request and the VPLMN, RVAS is applicable. The network node is also adapted to, in response to the determining, select the Roaming Control NF and the Home Control NF for the discovery request, and transmit, to the Visited NF, a response to the discovery request, the response comprising an address of the selected Roaming Control NF instead of an address of the selected Home Control NF. Some embodiments disclosed herein provide that the network node is additionally adapted to perform the steps of any of the above-disclosed methods attributed to the network node.

Embodiments of a method performed by a network node implementing a R-SMF of a telecommunications network for providing RVAS are also disclosed herein. The method comprises receiving a PDU session create request from a V-SMF. The method further comprises determining an H-SMF, and sending the PDU session create request to the H-SMF. According to some embodiments disclosed herein, determining the H-SMF comprises receiving, from an H-NRF a notification that indicates the H-SMF. In some such embodiments disclosed herein, the method further comprises sending a discovery request to an H-NRF, and receiving a discovery response from the H-NRF that indicates the H-SMF. Some embodiments disclosed herein provide that the method further comprises determining, by the R-SMF, to allocate its own User Plane Function (UPF), and informing the H-SMF of the allocated UPF.

Embodiments of a network node implementing a R-SMF of a telecommunications network for providing RVAS are also disclosed herein. According to some embodiments disclosed herein, the network node comprises a network interface, and processing circuitry associated with the network interface. The processing circuitry is configured to cause the network node to receive a PDU session create request from a V-SMF, and determine an H-SMF. The processing circuitry is further configured to cause the network node to send the PDU session create request to the H-SMF. In some such embodiments disclosed herein, the processing circuitry is additionally configured to cause the network node to perform the steps of any of the above-disclosed methods attributed to the network node.

Embodiments of a network node implementing a R-SMF of a telecommunications network for providing RVAS are also disclosed herein. Some embodiments disclosed herein provide that the network node is adapted to receive a PDU session create request from a V-SMF, and to determine an H-SMF. The network node is further adapted to send the PDU session create request to the H-SMF. According to some embodiments disclosed herein, the network node is additionally adapted to perform the steps of any of the above-disclosed methods attributed to the network node.

Embodiments of a method performed by a network node implementing a R-PCF of a telecommunications network for providing RVAS are also disclosed herein. The method comprises detecting, by the R-PCF, an H-PCF using a Network Repository Function, NRF.

Embodiments of a network node implementing a R-PCF of a telecommunications network for providing RVAS are also disclosed herein. In some such embodiments disclosed herein, the network node comprises a network interface, and processing circuitry associated with the network interface. The processing circuitry is configured to cause the network node to detect, by the R-PCF, an H-PCF using a Network Repository Function, NRF.

Embodiments of a network node implementing a R-PCF of a telecommunications network for providing RVAS are also disclosed herein. Some embodiments disclosed herein provide that the network node is adapted to detect, by the R-PCF, an H-PCF using a Network Repository Function, NRF.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
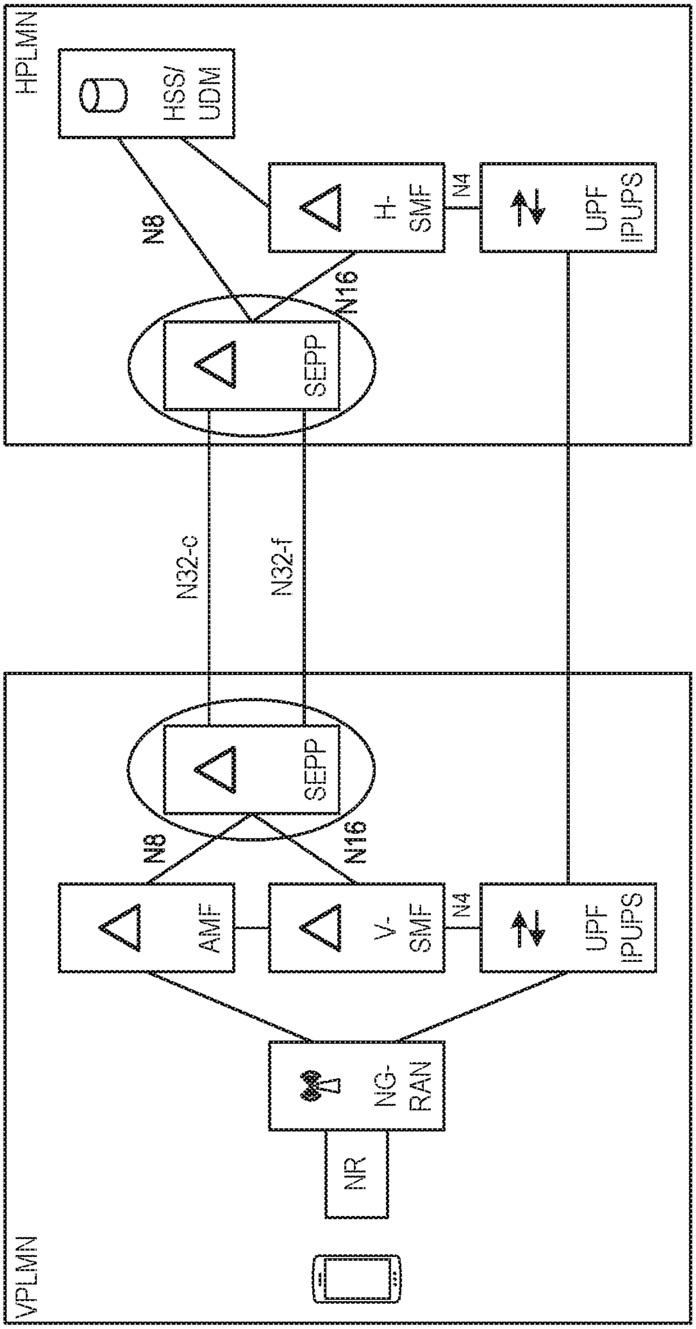
FIG. 1 illustrates the use of a Security Edge Protection Proxy (SEPP) to authenticate and protect incoming and outgoing control plane traffic over the interconnect between a Home Public Land Mobile Network (HPLMN) and a Visited Public Land Mobile Network (VPLMN)
Figure 2:
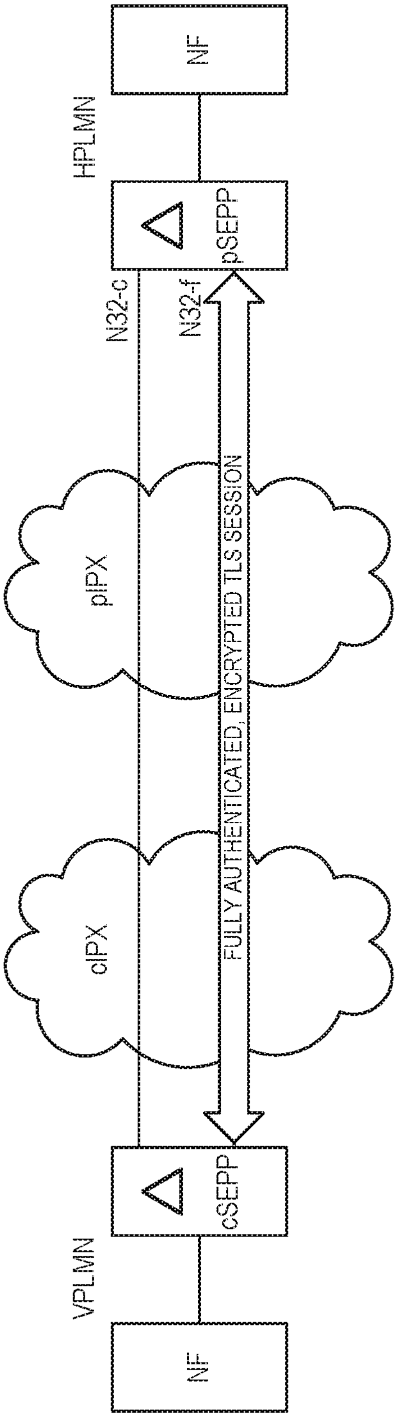
FIG. 2 illustrates an exemplary use of Transport Layer Security (TLS) to provide inter-Public Land Mobile Network (PLMN) security in Fifth Generation (5G) telecommunication networks.
Figure 3:
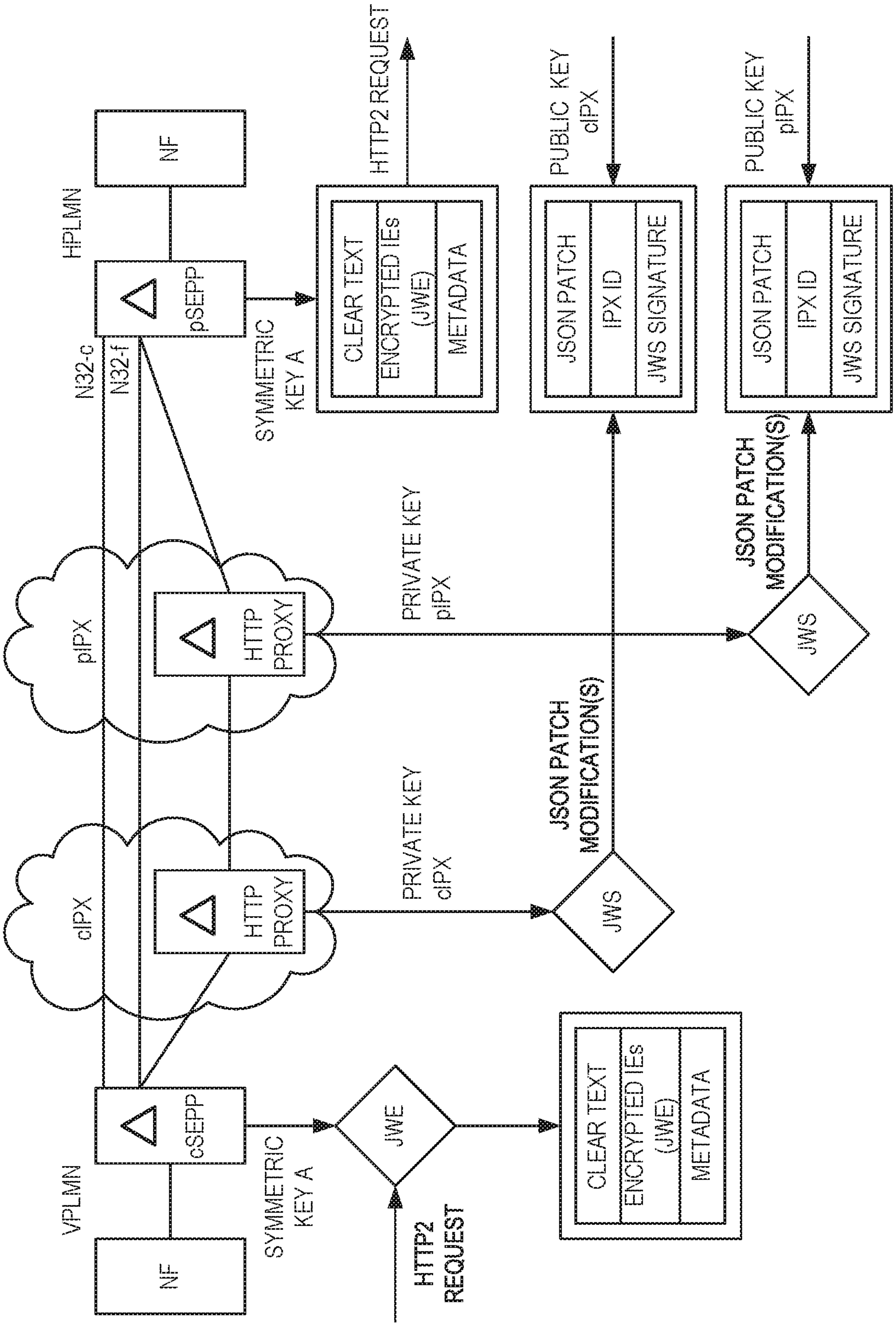
FIG. 3 illustrates another exemplary use of TLS when providing PLMN security in 5G telecommunication networks.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s). In particular, due to its complexity and the requirement that both roaming partners must support the Protocol for N32 Interconnect Security (PRINS) even if only one roaming partner would actually need it, the Global Systems for Mobile Communication (GSM) Association (GSMA) decided to look for alternative solutions to provide Roaming Value Added Services (RVAS). However, there is no solution to include network functions (NFs) provided by RVAS such that the use of RVAS in a Home Public Land Mobile Network (HPLMN) is not visible to a Visited Public Land Mobile Network (VPLMN) (so that, for example, if a VPLMN NF detects an HPLMN NF, then the RVAS NF will be responded back to the VPLMN NF, and the RVAS NF will interact with the actually requested HPLMN NF)

Thus, one issue to be addressed is how to discover both an RVAS NF and an HPLMN NF, and include them into the control plan without impacting the VPLMN. Note that the RVAS NF may be used by multiple HPLMNs.

Aspects of the present disclosure and their embodiments may provide solutions to the aforementioned or other challenges. In some embodiments, a Roaming Value Added Service (RVAS) Network Function (NFs) registers itself in a Home Network Repository Function (H-NRF) in addition to conventional NFs. Subsequently, if a Home NF (H-NF) is discovered for which an RVAS NF is also registered, the H-NRF selects both the RVAS NF and the H-NF, and informs the RVAS NF about the discovery including a selected H-NF. The H-NRF responds back to a Visited Network Repository Function (V-NRF) with the address of the RVAS NF. Whenever the RVAS NF receives a request from a Visited Network Function (V-NF), the RVAS NF performs any needed RVAS and forwards the possibly modified request to the H-NF. Further operations then depend on the actual NF.

There are, proposed herein, various embodiments which address one or more of the issues disclosed herein. In one embodiment, a method performed in a Home Public Land Mobile Network (HPLMN) of a telecommunications network for providing RVAS. The method comprises registering, by a network node implementing an H-NRF, a Home Session Management Function (H-SMF) and a RVAS Session Management Function (R-SMF) of the HPLMN. The method further comprises receiving a discovery request from a Visited Public Land Mobile Network (VPLMN). The method also comprises determining that, for the discovery request and the VPLMN, RVAS is applicable. The method additionally comprises, in response to the determining, determining that the R-SMF and the H-SMF are registered into the H-NRF. The method further comprises transmitting a response to the discovery request, the response comprising an address of the R-SMF instead of an address of the H-SMF.

In another embodiment, a method performed in an HPLMN of a telecommunications network for providing RVAS is provided. The method comprises registering, by a network node implementing an H-NRF, a Home Policy Control Function (H-PCF) and a RVAS Policy Control Function (R-PCF) of the HPLMN. The method further comprises receiving a discovery request from a Visited Public Land Mobile Network VPLMN. The method also comprises determining that, for the discovery request and the VPLMN, RVAS is applicable. The method additionally comprises, in response to the determining, determining that the R-PCF and the H-PCF are registered into the H-NRF. The method also comprises transmitting a response to the discovery request, the response comprising an address of the R-PCF instead of an address of the H-PCF.

Certain embodiments may provide one or more of the following technical advantage(s). In particular, embodiments described herein enable the inclusion of an RVAS NF into the control plane without visibility to a Visited Public Land Mobile Network (VPLMN).

Before discussing methods and apparatus for RVAS network function for HPLMN) in greater detail, exemplary cellular communications systems in which some embodiments of the present disclosure may be implemented are first discussed. In this regard, the following terms are defined:

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
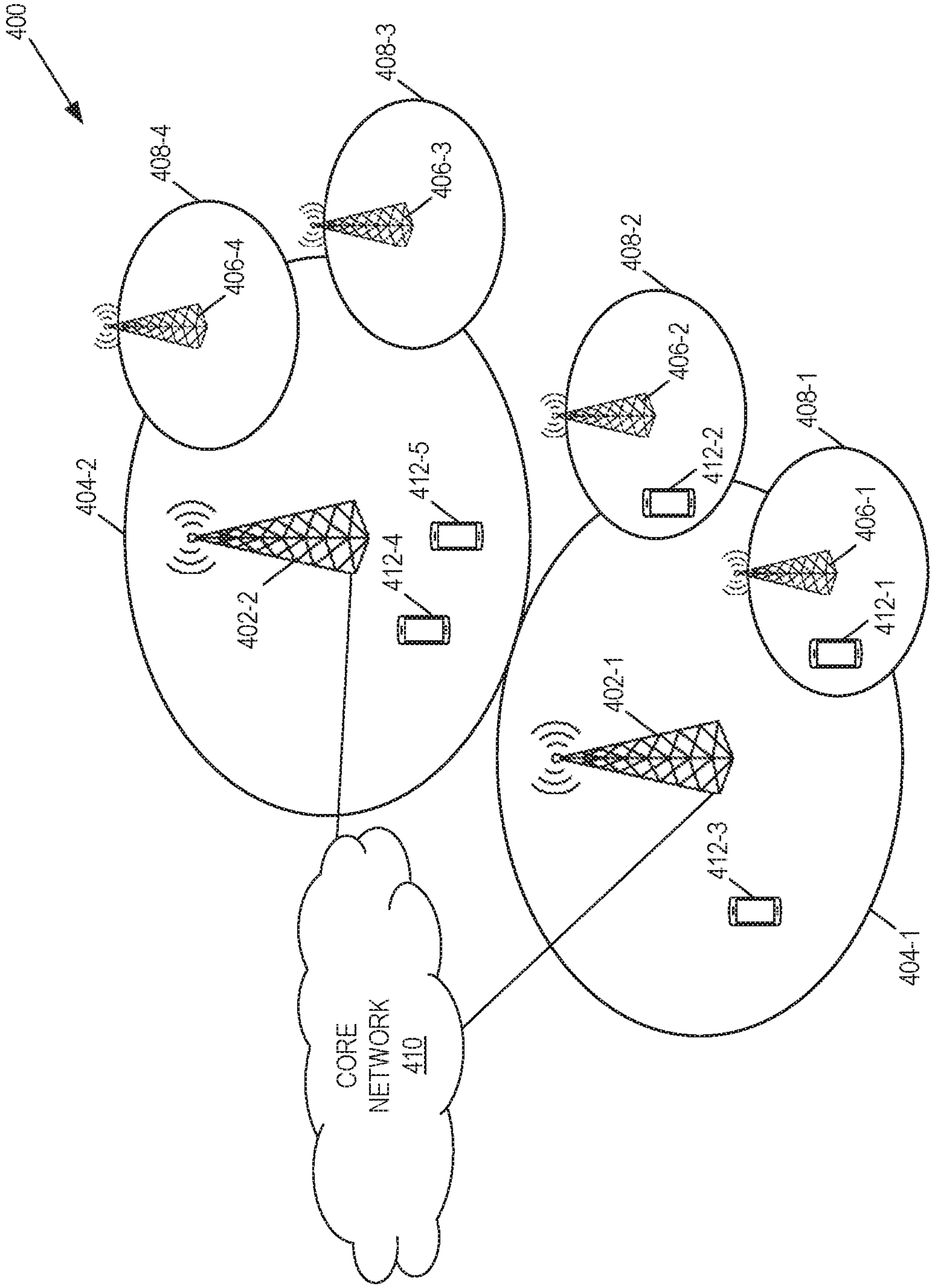
FIG. 4 illustrates one example of a cellular communications system according to some embodiments disclosed herein.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 402-1 and 402-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
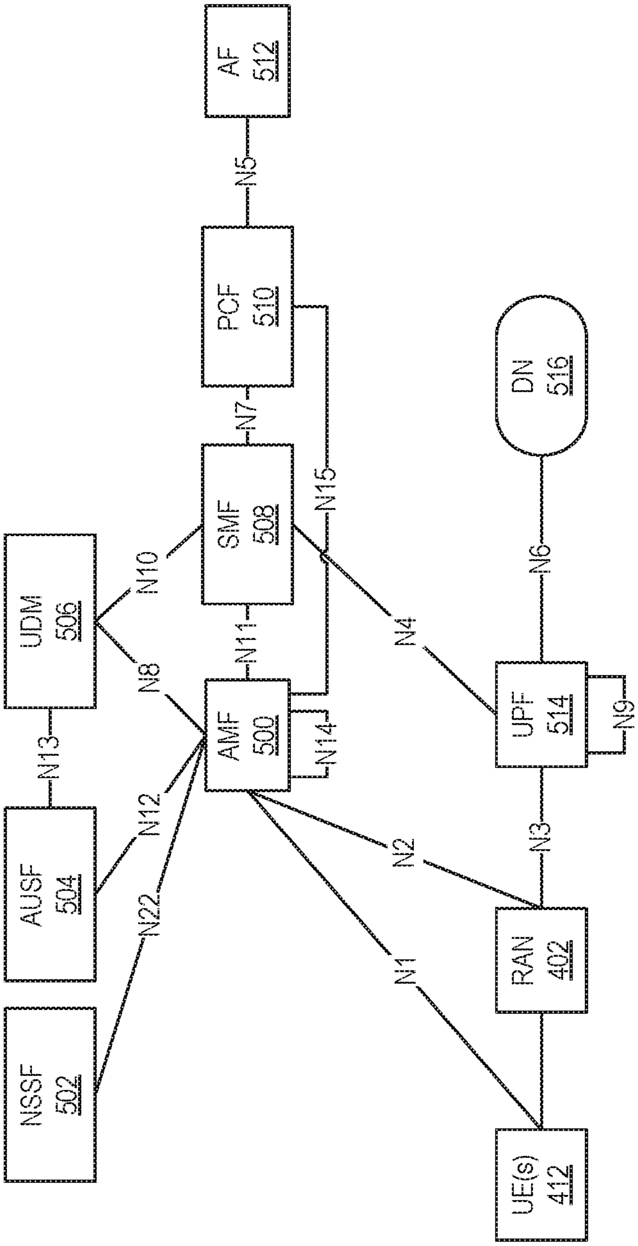
FIGS. 5 and 6 illustrate example embodiments in which the cellular communication system of FIG. 3 is a Fifth Generation (5G) System (5GS)

FIG. 5 illustrates a wireless communication system represented as a 5G network architecture composed of core Network Functions (NFs), where interaction between any two NFs is represented by a point-to-point reference point/interface. FIG. 5 can be viewed as one particular implementation of the system 400 of FIG. 4.

Seen from the access side the 5G network architecture shown in FIG. 5 comprises a plurality of UEs 412 connected to either a RAN 402 or an Access Network (AN) as well as an AMF 500. Typically, the RAN 402 comprises base stations, e.g., such as eNBs or gNBs or similar. Seen from the core network side, the 5GC NFs shown in FIG. 5 include a NSSF 502, an AUSF 504, a UDM 506, the AMF 500, a SMF 508, a PCF 510, and an Application Function (AF) 512.

Reference point representations of the 5G network architecture are used to develop detailed call flows in the normative standardization. The N1 reference point is defined to carry signaling between the UE 412 and AMF 500. The reference points for connecting between the AN 402 and AMF 500 and between the AN 402 and UPF 514 are defined as N2 and N3, respectively. There is a reference point, N11, between the AMF 500 and SMF 508, which implies that the SMF 508 is at least partly controlled by the AMF 500. N4 is used by the SMF 508 and UPF 514 so that the UPF 514 can be set using the control signal generated by the SMF 508, and the UPF 514 can report its state to the SMF 508. N9 is the reference point for the connection between different UPFs 514, and N14 is the reference point connecting between different AMFs 500, respectively. N15 and N7 are defined since the PCF 510 applies policy to the AMF 500 and SMF 508, respectively. N12 is required for the AMF 500 to perform authentication of the UE 412. N8 and N10 are defined because the subscription data of the UE 412 is required for the AMF 500 and SMF 508.

The 5GC network aims at separating UP and CP. The UP carries user traffic while the CP carries signaling in the network. In FIG. 5, the UPF 514 is in the UP and all other NFs, i.e., the AMF 500, SMF 508, PCF 510, AF 512, NSSF 502, AUSF 504, and UDM 506, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and a Data Network (DN) 516 (which provides Internet access, operator services, and/or the like) for some applications requiring low latency.

The core 5G network architecture is composed of modularized functions. For example, the AMF 500 and SMF 508 are independent functions in the CP. Separated AMF 500 and SMF 508 allow independent evolution and scaling. Other CP functions like the PCF 510 and AUSF 504 can be separated as shown in FIG. 5. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 6:
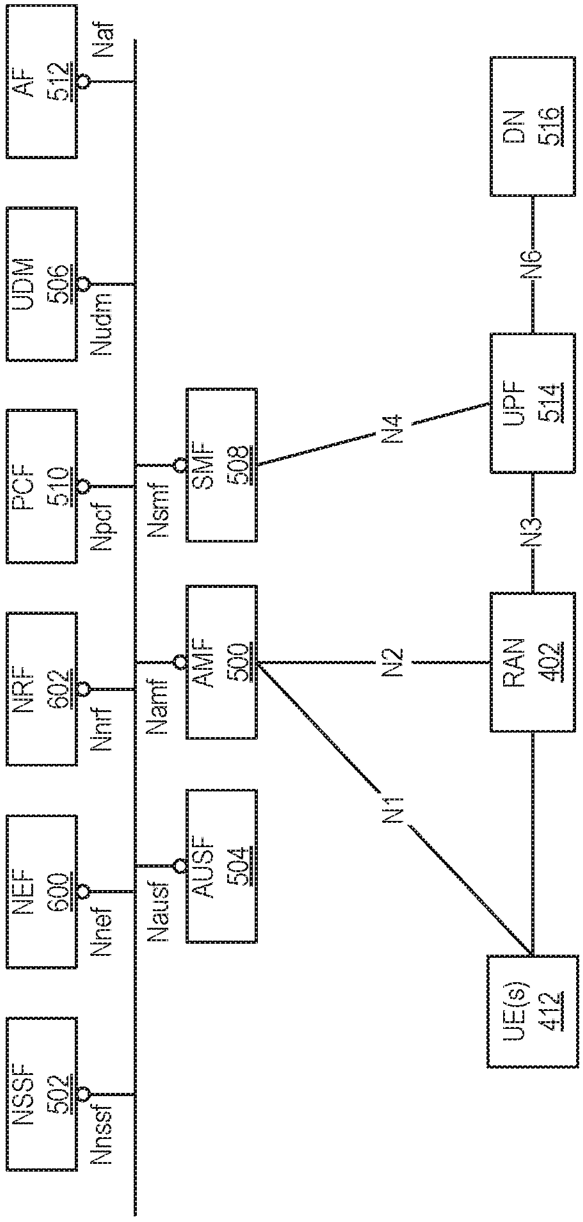

FIG. 6 illustrates a 5G network architecture using service-based interfaces between the NFs in the CP, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service-based interfaces are indicated by the letter "N" followed by the name of the NF, e.g., Namf for the service based interface of the AMF 500 and Nsmf for the service based interface of the SMF 508, etc. The NEF 600 and the NRF 602 in FIG. 6 are not shown in FIG. 5 discussed above. However, it should be clarified that all NFs depicted in FIG. 5 can interact with the NEF 600 and the NRF 602 of FIG. 6 as necessary, though not explicitly indicated in FIG. 5.

Some properties of the NFs shown in FIGS. 5 and 6 may be described in the following manner. The AMF 500 provides UE-based authentication, authorization, mobility management, etc. A UE 412 even using multiple access technologies is basically connected to a single AMF 500 because the AMF 500 is independent of the access technologies. The SMF 508 is responsible for session management and allocates Internet Protocol (IP) addresses to UEs. It also selects and controls the UPF 514 for data transfer. If a UE 412 has multiple sessions, different SMFs 508 may be allocated to each session to manage them individually and possibly provide different functionalities per session. The AF 512 provides information on the packet flow to the PCF 510 responsible for policy control in order to support Quality of Service (QoS). Based on the information, the PCF 510 determines policies about mobility and session management to make the AMF 500 and SMF 508 operate properly. The AUSF 504 supports authentication function for UEs or similar and thus stores data for authentication of UEs or similar while the UDM 506 stores subscription data of the UE 412. The Data Network (DN) 516, not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 7:
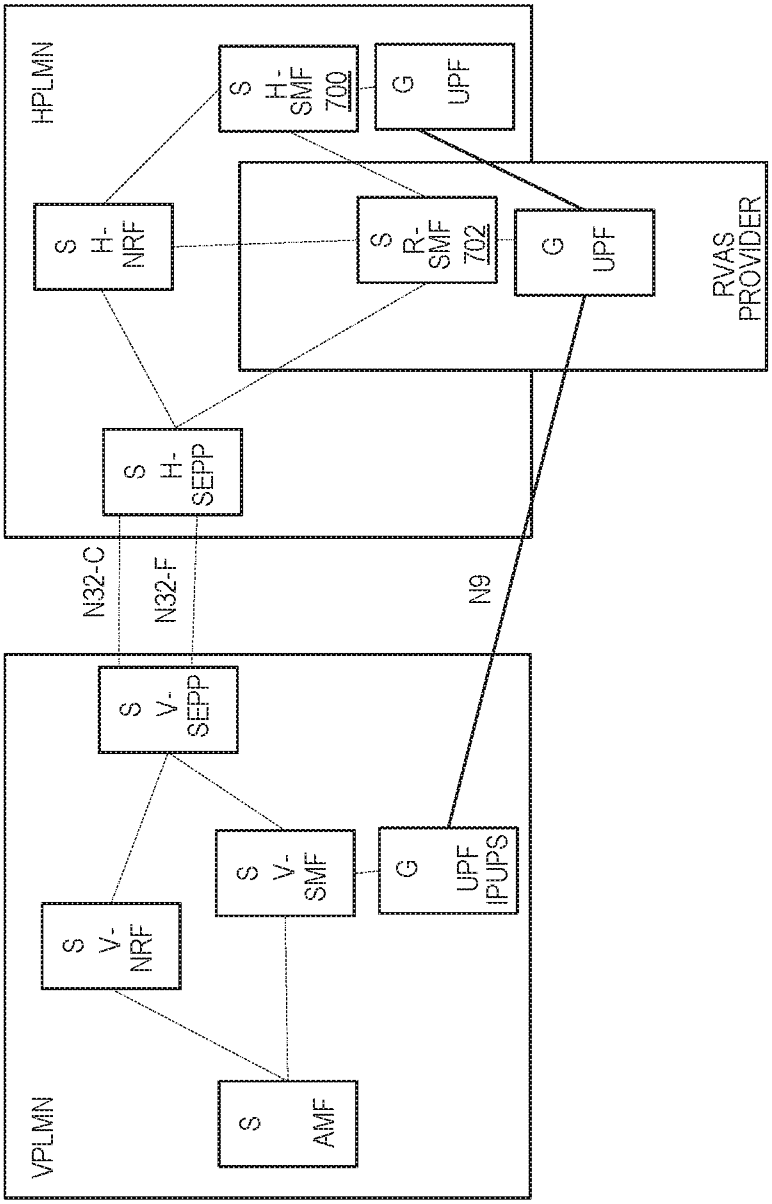
FIG. 7 illustrates an example embodiment in which a Roaming Value Added Services (RVAS) Session Management Function (R-SMF) is included during Protocol Data Unit (PDU) session establishment.

The subject matter disclosed herein provides methods and systems for in a Home Public Land Mobile Network (HPLMN) of a telecommunications network for providing Roaming Value Added Services (RVAS). FIG. 7 illustrates one embodiment in which an RVAS Session Management Function (R-SMF) is included during Protocol Data Unit (PDU) session establishment. In FIG. 7, both a Home Session Management Function (H-SMF) 700 and an R-SMF register 702 themselves in a Home Network Repository Function (H-NRF). An Access and Mobility Function (AMF) discovers both a Visited Session Management Function (V-SMF) and the H-SMF 700 via a Visited Network Repository Function (V-NRF). For discovery of the H-SMF 700, the V-NRF interacts with the H-SMF in conventional fashion according to established standards. Note that neither the existing AMF nor the V-NRF is impacted by the new functionality described herein.

The H-NRF detects that, for this particular Visited Public Land Mobile Network (VPLMN) and discovery request, RVAS is applicable. Thus, the H-NRF determines the R-SMF 702 and H-SMF 700. In the example of FIG. 7, only one instance each of the R-SMF 702 and the H-SMF 700 are determined, but some embodiments may provide that multiple instances of each are determined). Because both the R-SMF 702 and the H-SMF 700 have registered themselves in the H-NRF, the H-NRF is able to differentiate both.

In one embodiment, the H-NRF may inform the R-SMF 702 about the discovery request including the selected H-SMF 700. Some embodiments may provide that the H-NRF provides all information from the discovery request to the R-SMF 702, which then detects the H-SMF 700 on its own using a Network Repository Function (NRF).

The H-NRF then responds to the discover request with an address of the R-SMF 702 instead of an address of the H-SMF 700. Note that the H-NRF is aware that RVAS is applicable for the VPLMN based on configuration data (e.g., a list of VPLMNs, or simply a configuration applicable to all roaming cases). A PDU session establishment is then sent via the V-SMF to the R-SMF 702. The R-SMF 702 forwards the PDU session establishment to the already discovered H-SMF 700, and performs any needed RVAS. In some embodiments, the H-SMF 700 may need to be informed that the R-SMF 702 was inserted.

Transport Layer Security (TLS) is used for the control plane to and from the R-SMF 702. The H-SMF 700 allocates a User Plane Function (UFP), and sends a response to the R-SMF 702. The R-SMF 702 in some embodiments may decide whether to allocate its own UPF. If so, the R-SMF 702 informs the H-SMF 700 accordingly, and responds to the V-SMF. The remaining operations proceed in conventional fashion according to established standards.

Figure 8:
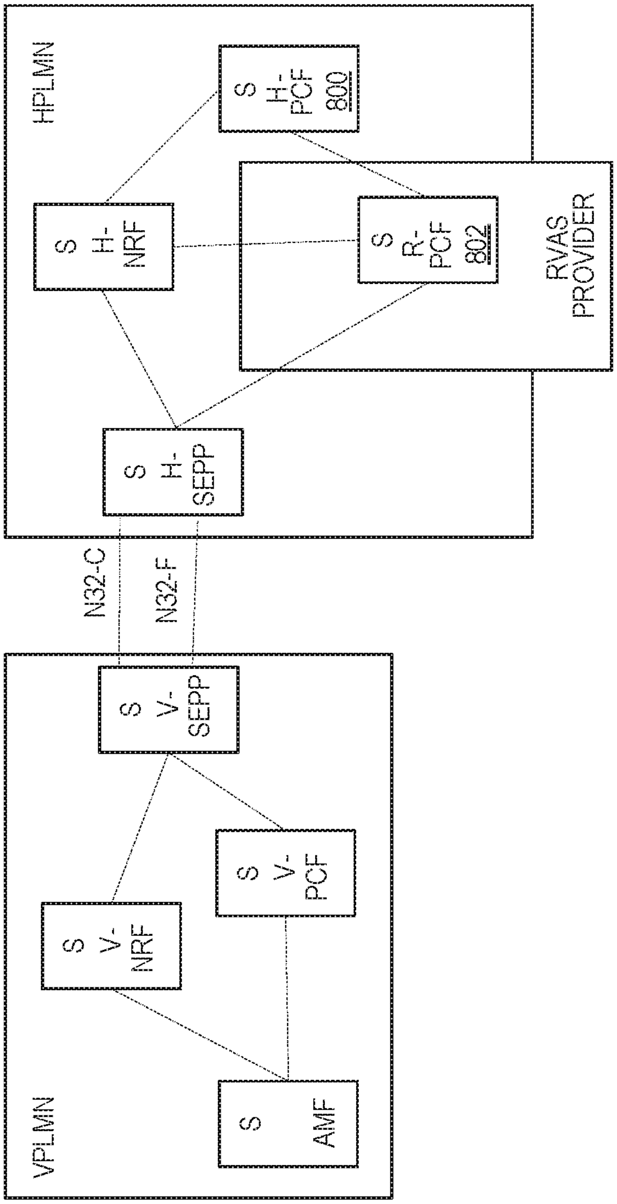
FIG. 8 illustrates another embodiment in which a RVAS Policy Control Function (R-PCF) is included during Protocol Data Unit (PDU) session establishment.

FIG. 8 illustrates another embodiment in which a RVAS Policy Control Function (R-PCF) is included during Protocol Data Unit (PDU) session establishment (initiated by an AMF or an SMF). In FIG. 8, a Home Policy Control Function (H-PCF) 800 and an R-PCF 802 register themselves in an H-NRF. An AMF subsequently discovers both a Visited Policy Control Function (V-PCF) and the H-PCF 800 via an NRF (e.g., a Visited NRF (V-NRF)). The V-PCF discovers the H-PCF 800 via the V-NRF for User Equipment (UE) and access and mobility policies, per established standards.

The H-NRF detects that, for this VPLMN and discover request, RVAS is applicable. The H-NRF next determines the R-PCF 802 and H-PCF 800. In the example of FIG. 8, only one instance each of the R-PCF 802 and the H-PCF 800 are determined, but some embodiments may provide that multiple instances of each are determined. The H-NRF then responds to the discovery request with an address of the R-PCF 802 instead of an address of the H-PCF 800.

In one embodiment, the H-NRF informs the R-PCF 802 about the discovery request, including the selected H-PCF 800. Some embodiments provide that the H-NRF provides all information from the discovery request to the R-PCF 802, which then detects the H-PCF 800 on its own using an NRF. TLS is used for the control plane to and from the R-PCF 802. It is to be understood that other RVAS NFs may be included in a manner similar to inclusion of the R-PCF 802.

According to some embodiments, a Home Security Edge Protection Proxy (HSEPP) can check whether an R-SMF or R-PCF 802 has done any disallowed modification before sending signaling messages to a VPLMN. Similarly, a Service Communication Proxy (SCP) (not shown) between the R-SMF or R-PCF 802 and the H-SMF or H-PCF 800 may also perform this task. Otherwise, the H-SMF or H-PCF 800 performs this check.

Figure 9A:
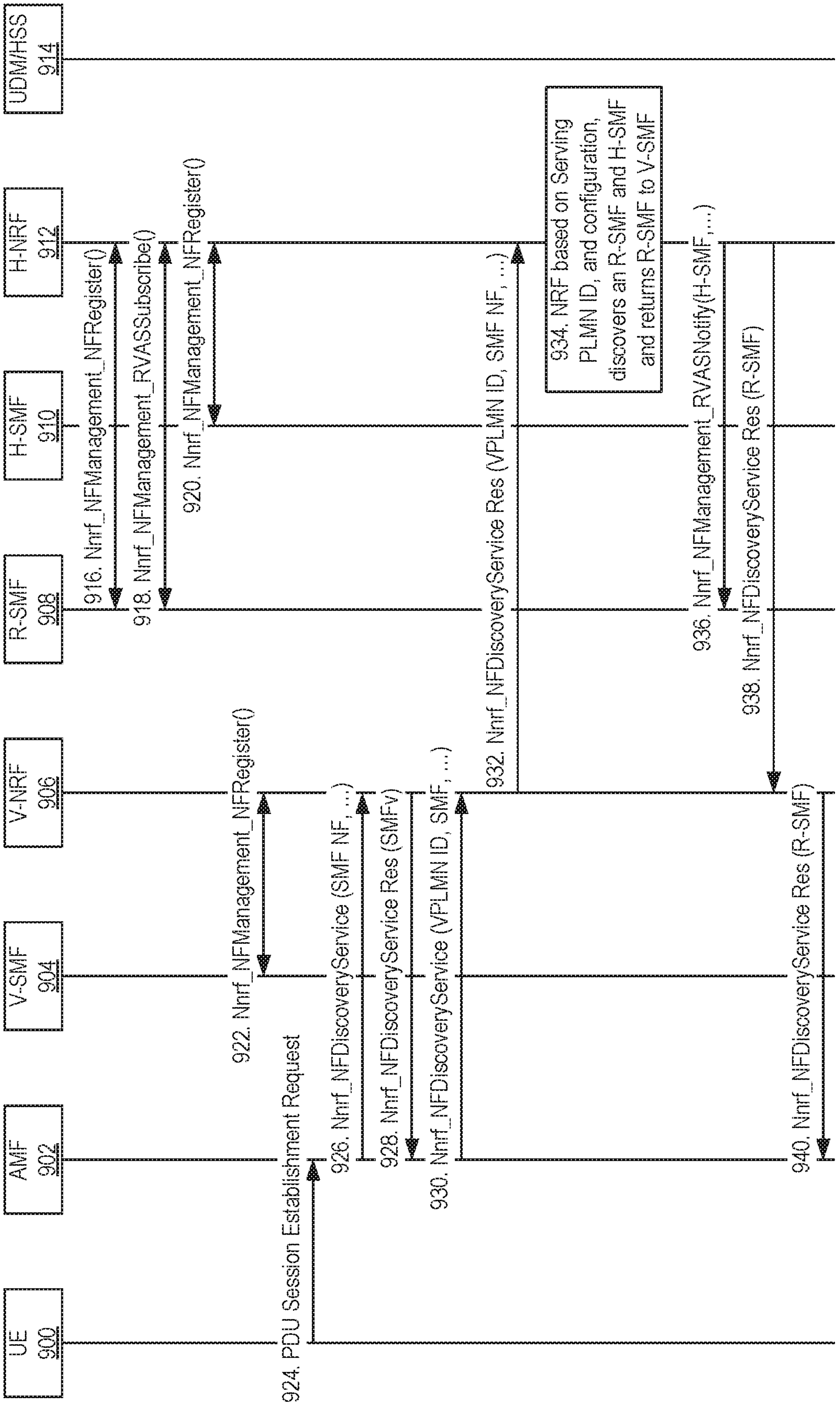
FIGS. 9A and 9B illustrate exemplary communication flows and operations for as provided in Third Generation Partnership Project (3GPP) Technical Specification (TS) 23.502, Release 16, with the addition of operations according to some embodiments disclosed herein.
Figure 9B:
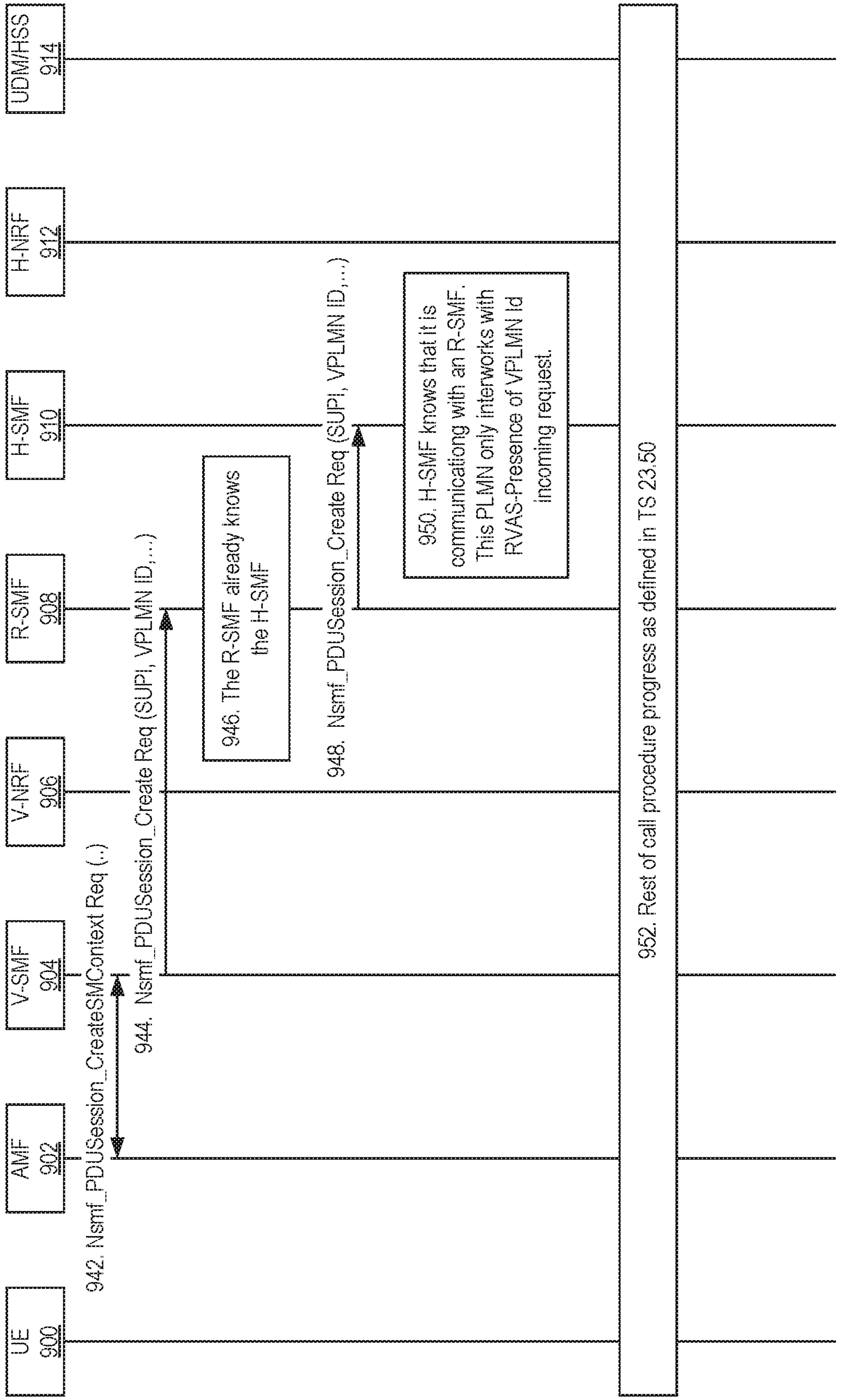

FIGS. 9A and 9B are call flow diagrams adapted from Third Generation Partnership Project (3GPP) Technical Specification (TS) 23.502, Release 16. FIGS. 9A and 9B show a UE 900, an AMF 902, a V-SMF 904, a V-NRF 906, an R-SMF 908, an H-SMF 910, an H-NRF 912, and a UDM/HSS 914 represented by vertical lines, with communications among these elements represented by arrows and operations performed by these elements represented by boxes. It is to be understood that the call flow proceeds according to standards as described in TS 23.502 except for the specific operations referenced below relating to embodiments described herein.

In FIG. 9A, at step 916, the R-SMF 908 registers with the H-NRF 912 by performing an Nnrf_NFManagement_NFRegister exchange to inform the H-NRF 912 of its NF profile. Step 918 is then performed, at which the R-SMF 908 subscribes to the H-NRF 912 to be informed about a selection of an H-SMF such as the H-SMF 910. At step 920, the H-SMF 910 also registers with the H-NRF 912 to inform the H-NRF 912 of its NF profile. Likewise, at step 922, the V-SMF 904 registers with the V-NRF 906 via an Nnrf_NF-Management_NFRegister exchange to inform the V-NRF 906 of its NF profile.

At step 924, the UE 900 initiates a PDU session establishment procedure by sending a PDU Session Establishment Request to the AMF 902. The AMF 902 at step 926 queries the V-NRF 906 by invoking a Nnrf_NFDiscovery-Request service to discover a V-SMF such as the V-SMF 904, and receives a response identifying the V-SMF 904 at step 928. The AMF 902 at step 930 also queries the V-NRF 906 via an invocation of a Nnrf_NFDiscoveryRequest service to discover the H-SMF 910. At step 932, the V-NRF 906 identifies the H-NRF 912, and invokes the Nnrf_NFDiscovery_Request service to discover the H-SMF 910.

At step 934, the H-NRF 912 selects both the R-SMF 908 and the H-SMF 910. The H-NRF 912 at step 936 informs the R-SMF 908 about the selected H-SMF 910 for a particular combination of Serving PLMN identifier (ID), PDU session ID, V-SMF, Data Network Name (DNN), Single Network Slice Selection Assistance Information (S-NSSAI), and other parameters in the discovery request. At step 938, the H-NRF 912 informs the V-NRF 906 about the selected R-SMF 908, and the V-NRF 906 then informs the AMF 902 about the selected R-SMF 908 at step 940. Operations then continue at step 942 of FIG. 9B.

Referring now to FIG. 9B, at step 942, the AMF 902 invokes the Nsmf_PDUSession_CreateSMContext service with the V-SMF 904 to create an association with an SMF for the PDU Session ID provided by the UE. The V-SMF 904 sends a request to create the PDU session to the R-SMF 908 at step 944. Note that at step 946, the R-SMF 908 already has the information based on which the H-SMF 910 was selected. Using that information, the R-SMF 908 sends a request to create the PDU session to the H-SMF 910 at step 948. At step 950, it is noted that the H-SMF 910 knows that it is communicating with the R-SMR 908. The remainder of the call procedure then proceeds as defined in TS 23.502, as indicated at step 952.

Figure 10A:
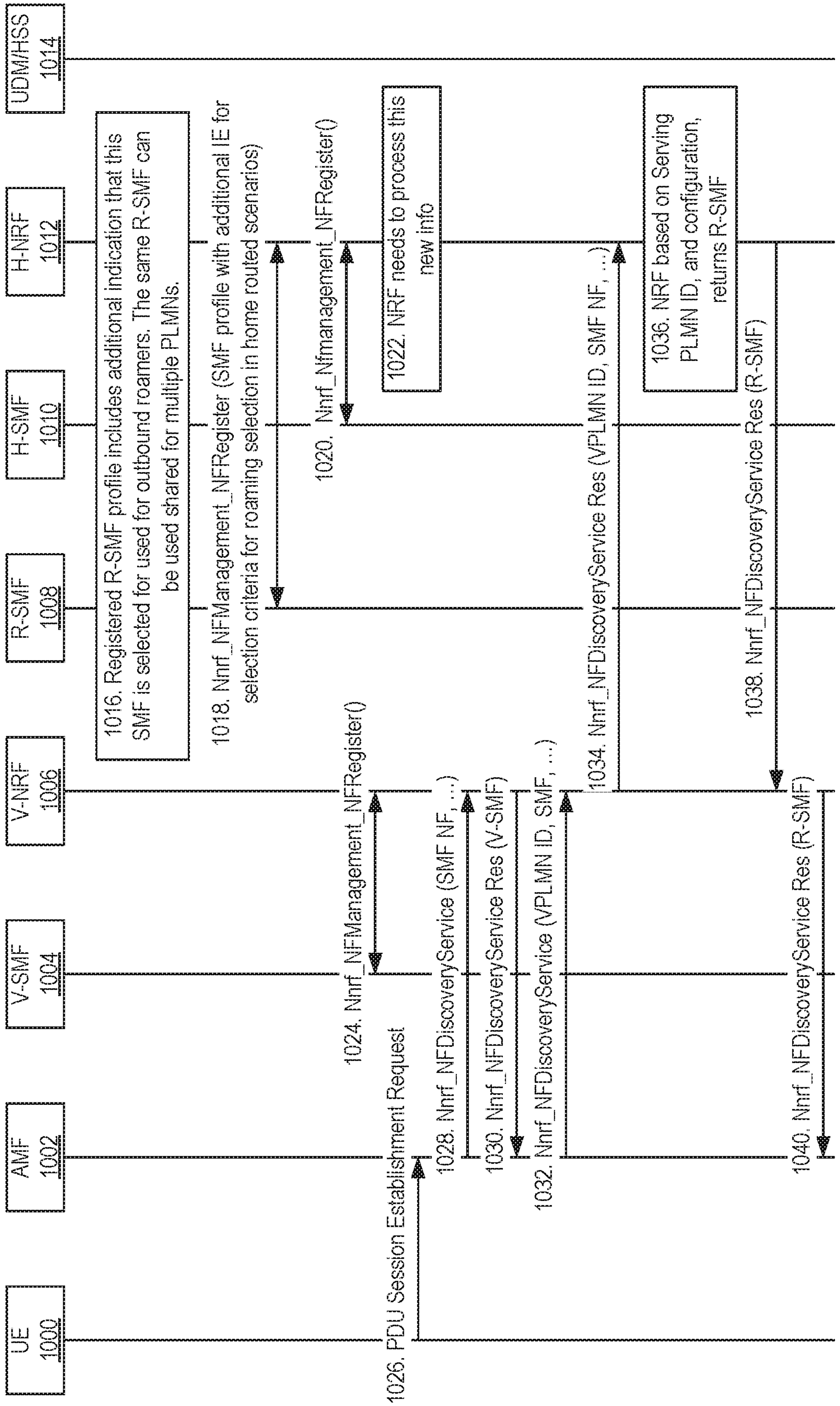
FIGS. 10A and 10B illustrate further exemplary communication flows and operations for as provided in 3GPP TS 23.502, Release 16, with the addition of operations according to some embodiments disclosed herein.
Figure 10B:
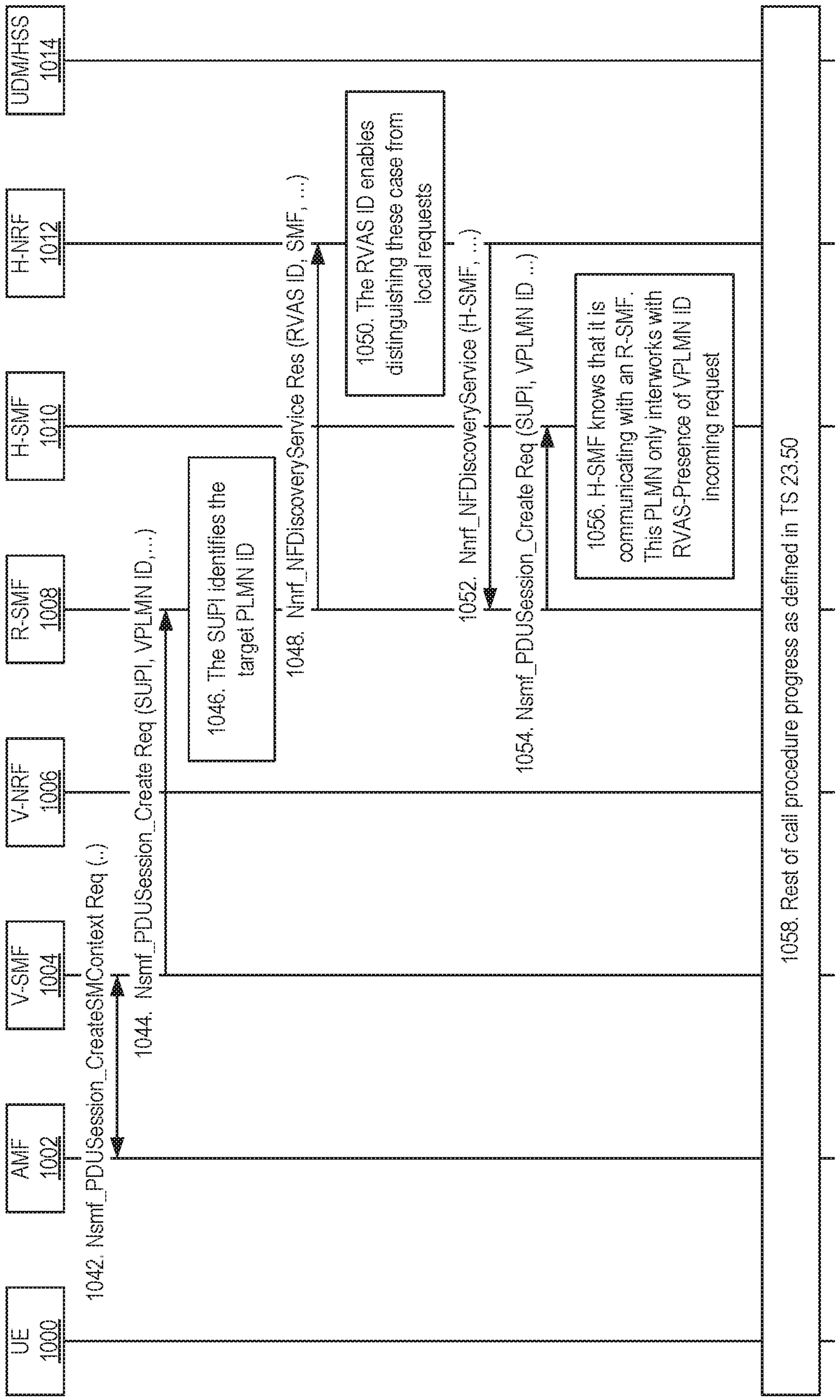

FIGS. 10A and 10B are call flow diagrams adapted from 3GPP TS 23.502, Release 16. A UE 1000, an AMF 1002, a V-SMF 1004, a V-NRF 1006, an R-SMF 1008, an H-SMF 1010, an H-NRF 1012, and a UDM/HSS 1014 represented in FIGS. 10A and 10B by vertical lines, with communications among these elements represented by arrows and operations performed by these elements represented by boxes. As with FIGS. 9A and 9B, it is to be understood that the call flow in FIGS. 10A and 10B proceeds according to standards as described in TS 23.502 except for the specific operations referenced below relating to embodiments described herein.

In FIG. 10A, at step 1016, it is noted that a registered R-SMF profile includes additional information indicating that this SMF is acting as the R-SMF 1008. At step 1018, the R-SMF 1008 registers with the H-NRF 1012 via an Nnrf_NFManagement_NFRegister exchange. At step 1020, the H-SMF 1010 also performs an Nnrf_NFManagement_NFRegister exchange with the H-NRF 1012 to register with the H-NRF 1012. Note at step 1022 that the H-NRF 1012 processes the new information indicated in step 1016.

At step 1024, the V-SMF 904 registers with the V-NRF 906 via an Nnrf_NFManagement_NFRegister exchange. The UE 1000 at step 1026 sends a PDU Session Establishment Request to the AMF 1002 to initiate a PDU session establishment procedure. At step 1028, the AMF 1002 queries the V-NRF 1006 by invoking a Nnrf_NFDiscoveryRequest service to discover the V-SMF 1004, and receives a response identifying the V-SMF 1004 at step 1030. The AMF 1002 at step 1032 also queries the V-NRF 1006 by invoking a Nnrf_NFDiscoveryRequest service to discover the H-SMF 1010. At step 1034, the V-NRF 1006 identifies the H-NRF 1012, and invokes the Nnrf_NFDiscovery_Request service to discover the H-SMF 1010.

The H-NRF 1012 at step 1036 selects the R-SMF 1008 instead of the H-SMF 1010. At step 1038, the H-NRF 1012 informs the V-NRF 1006 about the selected R-SMF 1008. The V-NRF 1006 then informs the AMF 1002 about the selected R-SMF 1008 at step 1040. Operations then continue at step 1042 of FIG. 10B.

Turning now to FIG. 10B, at step 1042, the AMF 1002 invokes the Nsmf_PDUSession_CreateSMContext service with the V-SMF 1004 to create an association with an SMF for the PDU Session ID provided by the UE. The V-SMF 1004 sends a request to create the PDU session to the R-SMF 1008 at step 1044. At step 1046, it is noted that the SUPI received from the V-SMF 1004 identifies the target PLMN ID. If required and not already performed as part of step 1036, the R-SMF 1008 discovers the H-SMF 1010 at step 1048. If available, the R-SMF 1008 uses the discovery and selection parameters in performing the operations of step 1048. At step 1050, the H-NRF 1012 uses the RVAS-ID of the RVAS operator to distinguish this case from the roaming case, and returns the H-SMF 1010 at step 1052. The H-NRF 1012 may provide discovery and selection parameters (not shown) to the R-SMF 1008. The discovery and selection parameters may include, as non-limiting examples, S-NSSAI, DNN, and/or other information received from the V-NRF 1006. The R-SMF 1008 may immediately discover and select the H-SMF 1010.

The R-SMF 908 at step 1054 sends a request to create the PDU session to the H-SMF 910 at step 948. At step 1056, the H-SMF 910 knows that it is communicating with the R-SMR 908, and the H-SMF 1010 maintains in the state information that it holds for the PDU session that the PDU session is RVAS-related for statistical and charging purposes. The remainder of the call procedure proceeds as defined in TS 23.502, as indicated at step 1058.

Figure 11:
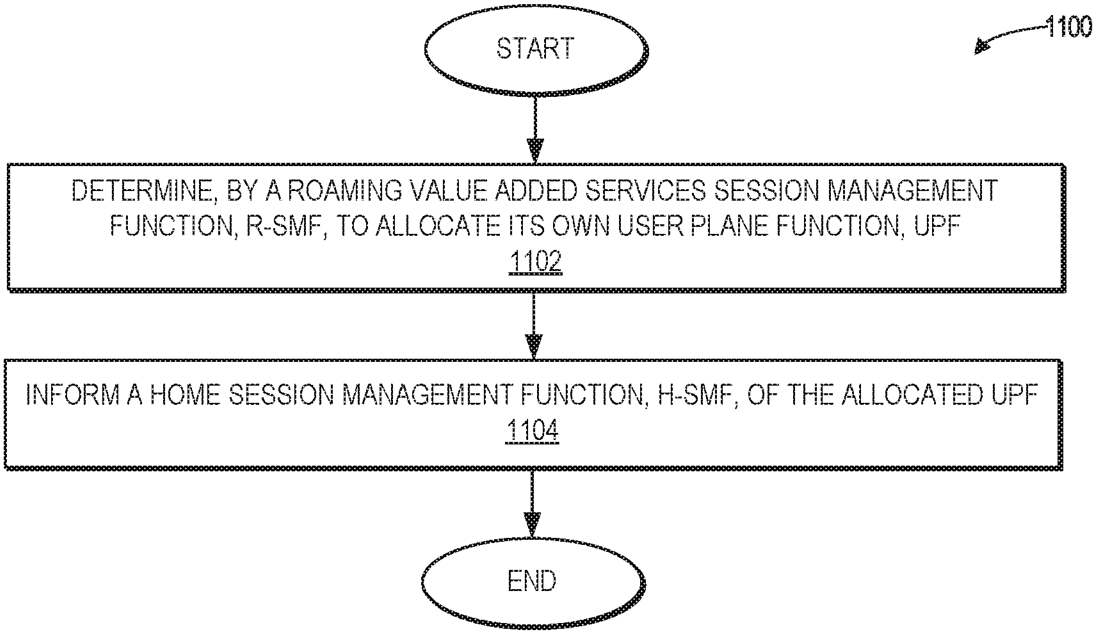
FIG. 11 illustrates exemplary operations performed by a R-SMF to allocate its own User Plane Function (UPF) according to some embodiments disclosed herein.

To illustrate exemplary operations performed by a R-SMF to allocate its own UPF according to some embodiments disclosed herein, FIG. 11 provides a flowchart 1100. Operations in FIG. 11 begin with a R-SMF determining to allocate its own UPF (block 1102). The R-SMF then informs an H-SMF of the allocated UPF (block 1104).

Figure 12:
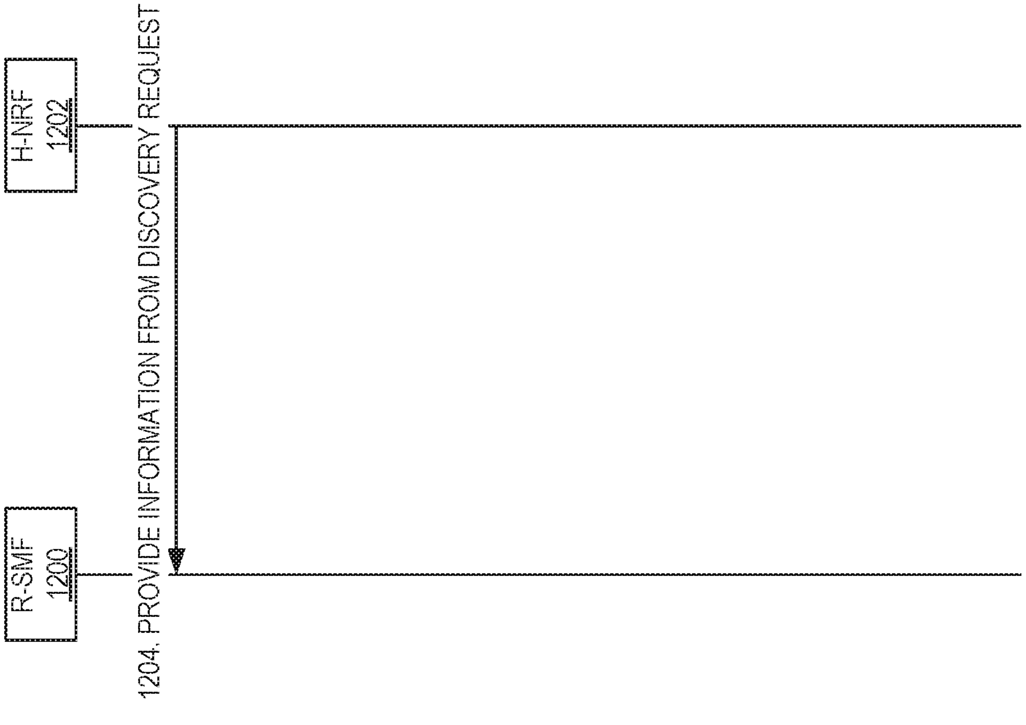
FIG. 12 illustrates exemplary communication flows for a Home Network Repository Function (H-NRF) providing discovery request information to an R-SMF according to some embodiments disclosed herein.

FIG. 12 provides a call flow diagram to illustrate exemplary communication flows for an H-NRF providing discovery request information to an R-SMF according to some embodiments disclosed herein. In FIG. 12, an R-SMF 1200 and an H-NRF 1202 are represented by vertical lines, with communication flows between the R-SMF 1200 and the H-NRF 1202 represented by arrows. Thus, as seen in FIG. 12, the H-NRF 1202 provides information from a discovery request to the R-SMF 1200, as indicated by arrow 1204.

Figure 13:
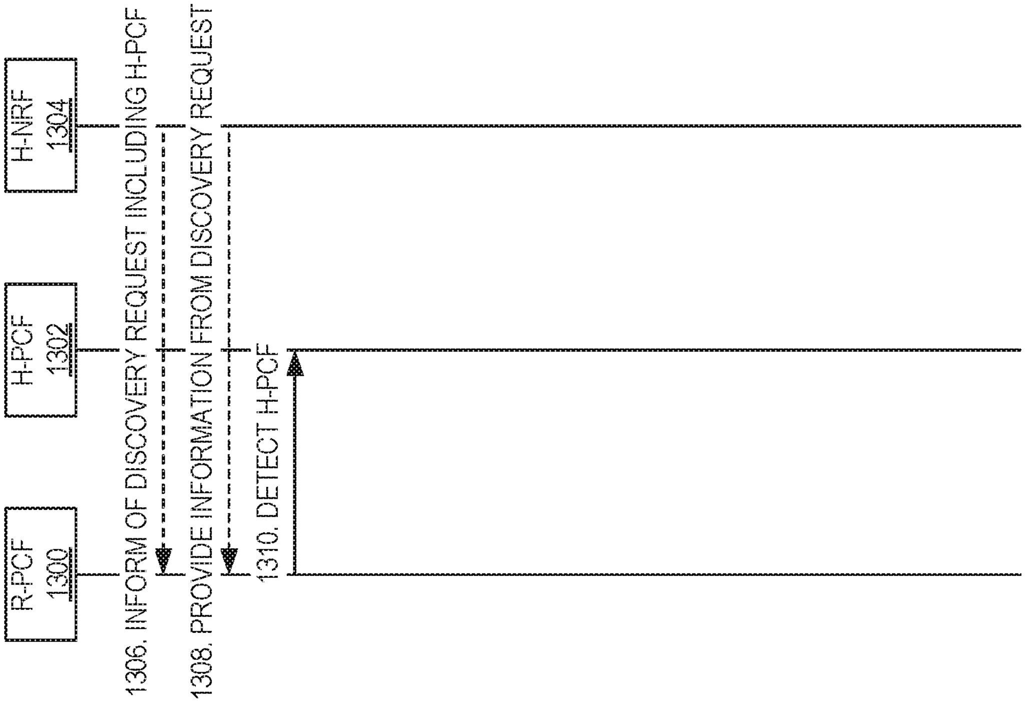
FIG. 13 illustrates exemplary communication flows for an H-NRF providing discovery request information to an R-PCF according to some embodiments disclosed herein.

To illustrate exemplary communication flows for an H-NRF providing discovery request information to an R-PCF according to some embodiments disclosed herein, FIG. 13 is provided. In FIG. 13, an R-PCF 1300, an H-PCF 1302, and an H-NRF 1304 are represented by vertical lines, with communication flows between these elements represented by arrows. In FIG. 13, the H-NRF 1304 informs the R-PCF 1300 of a discovery request including the H-PCF 1302, as indicated by arrow 1306. The H-NRF 1304 also provides information from the discovery request to the R-PCF 1300, as indicated by arrow 1308. Finally, the R-PCF 1300 detects the H-PCF 1310, as indicated by arrow 1310.

Figure 14:
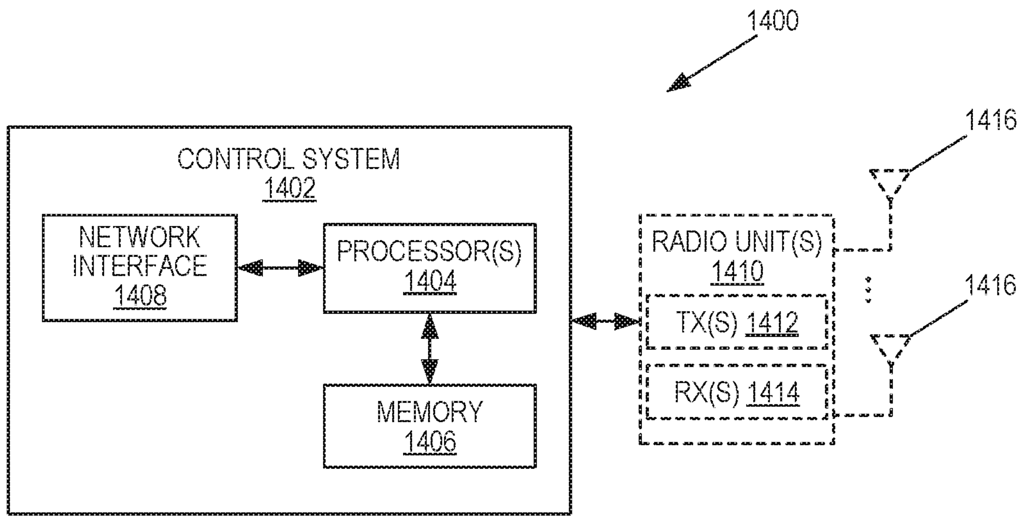
FIG. 14 illustrates a radio access node according to some embodiments disclosed herein.

FIG. 14 is a schematic block diagram of a radio access node 1400 according to some embodiments of the present disclosure. Optional features are represented by dashed boxes. The radio access node 1400 may be, for example, a base station 402 or 406 or a network node that implements all or part of the functionality of the base station 402 or gNB described herein. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, the radio access node 1400 may include one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein. In some embodiments, the function(s) are implemented in software that is stored, e.g., in the memory 1406 and executed by the one or more processors 1404.

Figure 15:
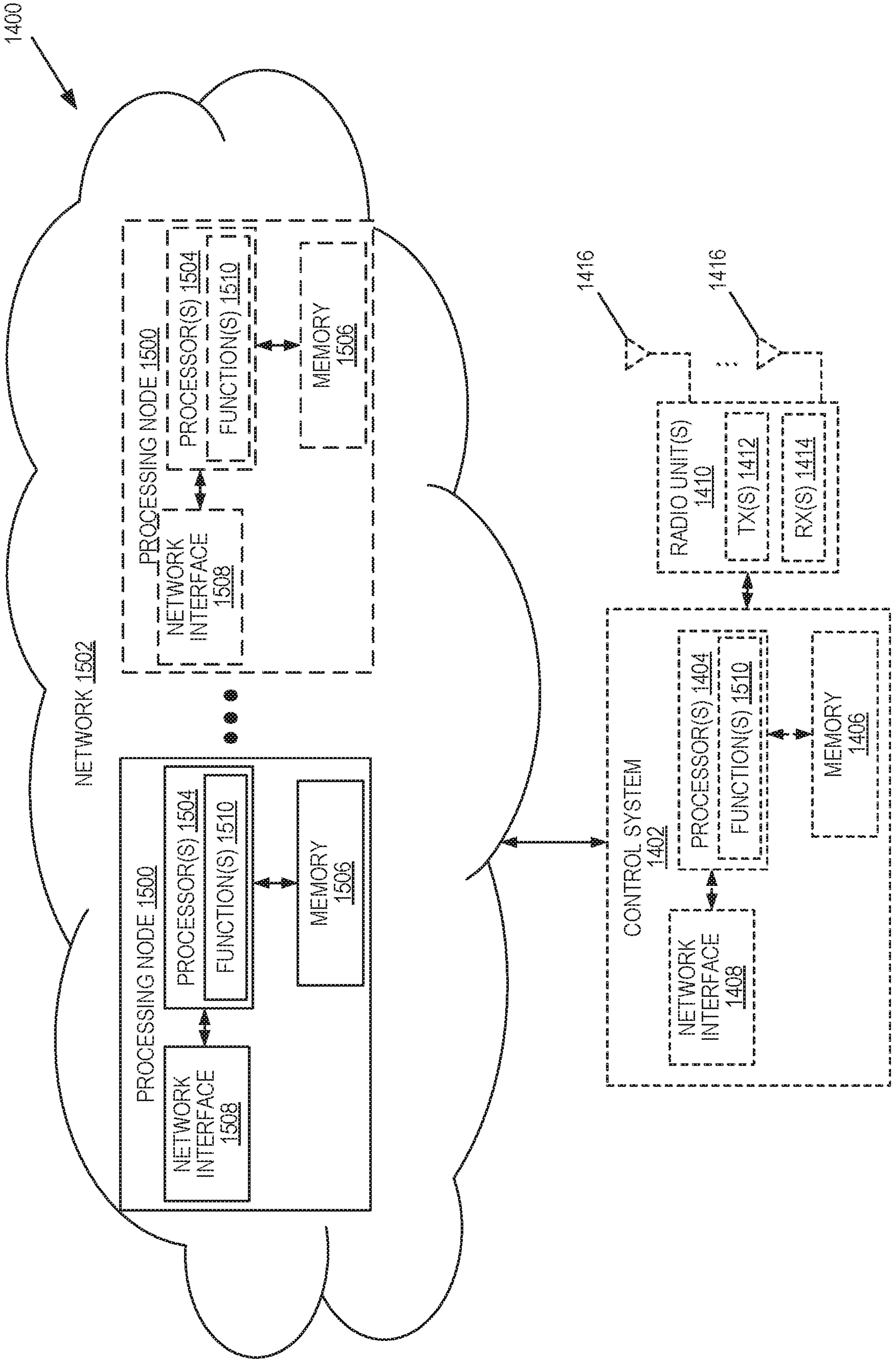
FIG. 15 illustrates a virtualized embodiment of the radio access node of FIG. 14 according to some embodiments disclosed herein.

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node (s) in a network(s)). As illustrated, in this example, the radio access node 1400 may include the control system 1402 and/or the one or more radio units 1410, as described above.

The control system 1402 may be connected to the radio unit(s) 1410 via, for example, an optical cable or the like. The radio access node 1400 includes one or more processing nodes 1500 coupled to or included as part of a network(s) 1502. If present, the control system 1402 or the radio unit(s) are connected to the processing node(s) 1500 via the network 1502. Each processing node 1500 includes one or more processors 1504 (e.g., CPUs, ASICs, FPGAs, and/or the like), memory 1506, and a network interface 1508.

In this example, functions 1540 of the radio access node 1400 described herein are implemented at the one or more processing nodes 1500 or distributed across the one or more processing nodes 1500 and the control system 1402 and/or the radio unit(s) 1410 in any desired manner. In some particular embodiments, some or all of the functions 1540 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1540. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1540 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
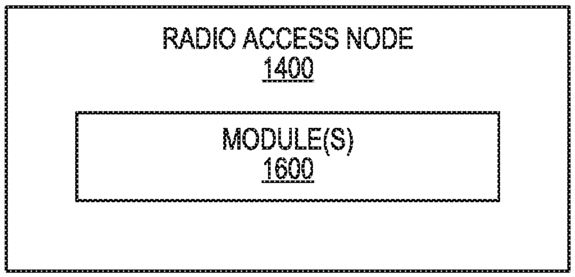
FIG. 16 illustrates the radio access node of FIG. 14 according to some other embodiments disclosed herein.

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein. This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
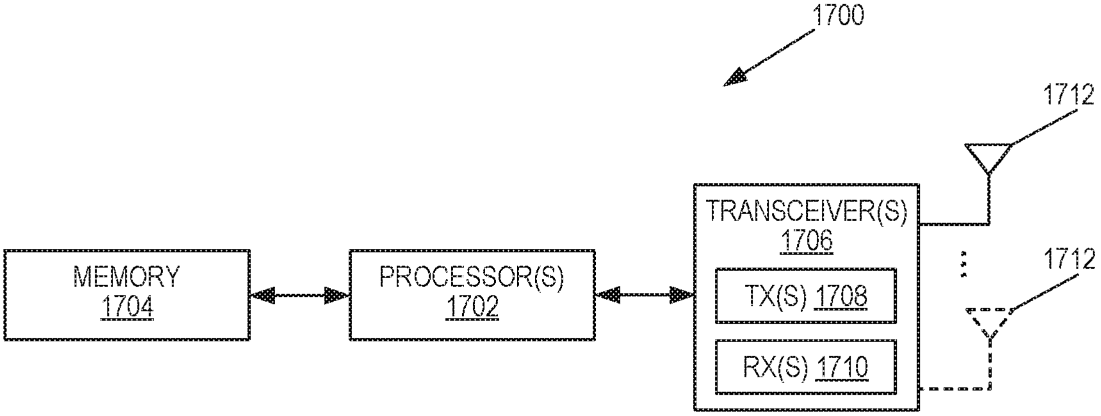
FIG. 17 illustrates a UE according to some embodiments disclosed herein.

FIG. 17 is a schematic block diagram of a wireless communication device 1700 according to some embodiments of the present disclosure. As illustrated, the wireless communication device 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the wireless communication device 1700 described above may be fully or partially implemented in software that is, e.g., stored in the memory 1704 and executed by the processor(s) 1702. Note that the wireless communication device 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the wireless communication device 1700 and/or allowing output of information from the wireless communication device 1700), a power supply (e.g., a battery and associated power circuitry), etc.

In some embodiments, a computer program including instructions which, when executed by at least one processor, causes the at least one processor to carry out the functionality of the wireless communication device 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
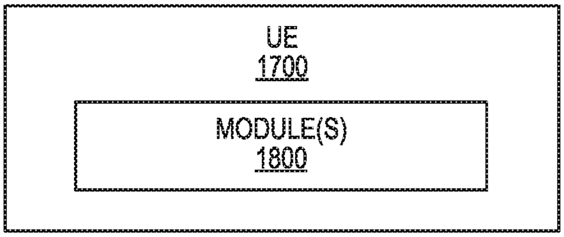
FIG. 18 illustrates the UE of FIG. 17 according to some other embodiments disclosed herein.

FIG. 18 is a schematic block diagram of the wireless communication device 1700 according to some other embodiments of the present disclosure. The wireless communication device 1700 includes one or more modules 1800, each of which is implemented in software. The module(s) 1800 provide the functionality of the wireless communication device 1700 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed in a Home Public Land Mobile Network (HPLMN) of a telecommunications network for providing Roaming Value Added Services (RVAS), the method comprising:

registering, by a network node implementing a Home Network Repository Function (H-NRF), a Home Session Management Function (H-SMF) and a RVAS Session Management Function (R-SMF) of the HPLMN;

receiving a discovery request from a Visited Public Land Mobile Network (VPLMN);

determining that, for the discovery request and the VPLMN, RVAS is applicable; and in response to the determining:

determining that the R-SMF and the H-SMF are registered into the H-NRF; and transmitting a response to the discovery request, the response comprising an address of the R-SMF instead of an address of the H-SMF.

Embodiment 2: The method of embodiment 1, wherein the method further comprises, prior to transmitting the response, informing the R-SMF of the discovery request including the determined H-SMF.

Embodiment 3: The method of embodiment 1, wherein the method further comprises, prior to transmitting the response:

providing the discovery request to the R-SMF; and detecting, by the R-SMF, the H-SMF using a Network Repository Function (NRF).

Embodiment 4: The method of embodiment 1, further comprising:

transmitting a Protocol Data Unit (PDU) establishment request via a Visited Session Management Function (V-SMF) to the R-SMF;

performing, by the R-SMF, any needed RVAS;

forwarding, by the R-SMF, the PDU establishment requestion to the H-SMF;

informing the H-SMF that the R-SMF was inserted;

allocating, by the H-SMF, a User Plane Function (UPF);

transmitting, by the H-SMF, a response to the R-SMF;

determining, by the R-SMF, to allocate its own UPF;

informing the H-SMF of the allocated UPF; and responding, by the R-SMF, to the V-SMF.

Embodiment 5: A method performed in a Home Public Land Mobile Network (HPLMN) of a telecommunications network for providing Roaming Value Added Services (RVAS), the method comprising:

registering, by a network node implementing a Home Network Repository Function (H-NRF), a Home Policy Control Function (H-PCF) and a RVAS Policy Control Function (R-PCF) of the HPLMN;

receiving a discovery request from a Visited Public Land Mobile Network (VPLMN);

determining that, for the discovery request and the VPLMN, RVAS is applicable; and in response to the determining:

determining that the R-PCF and the H-PCF are registered into the H-NRF; and transmitting a response to the discovery request, the response comprising an address of the R-PCF instead of an address of the H-PCF.

Embodiment 6: The method of embodiment 5, wherein the method further comprises:

informing the R-PCF of the discovery request including a Home Session Management Function (H-SMF); and detecting, by the R-PCF, the H-PCF using a Network Repository Function (NRF).

Embodiment 7: The method of embodiment 5, wherein the method further comprises providing the discovery request to the R-PCF.

Embodiment 8: The method of embodiment 5, further comprising:

discovering, by a RVAS Session Management Function (R-SMF) of the HPLMN, a Home Session Management Function (H-SMF);

determining, by the H-NRF based on an RVAS identifier (RVAS-ID) of an RVAS operator of the HPLMN, that roaming is not applicable;

based on the determining, returning, by the H-NRF, the H-SMF; and maintaining, by the H-SMF, an indication that a Protocol Data Unit (PDU) session is RVAS-related for statistical and charging purposes.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method for providing Roaming Value Added Services (RVAS) comprising:

at a Home Network Repository Function (H-NRF) in a Home Public Land Mobile Network (HPLMN) of a telecommunications network:

obtaining information about a Home Control Network Function (NF) and a Roaming Control NF;

at a Visited NF in a Visited Public Land Mobile Network (VPLMN):

sending a discovery request to the H-NRF in the HPLMN;

at the H-NRF:

receiving the discovery request from the Visited NF in the VPLMN;

determining that, for the discovery request and the VPLMN, RVAS is applicable; and in response to the determining:

selecting the Roaming Control NF and the Home Control NF for the discovery request; and transmitting, to the Visited NF, a response to the discovery request, the response comprising an address of the selected Roaming Control NF instead of an address of the selected Home Control NF; and at the Visited NF:

receiving the response to the discovery request from the H-NRF, wherein the Roaming Control NF comprises an RVAS Session Management Function (R-SMF);

wherein the Home Control NF comprises a Home Session Management Function (H-SMF);

wherein the method further comprises, at the Roaming Control NF:

receiving, from a Visited Session Management Function (V-SMF) in the VPLMN, a Protocol Data Unit (PDU) session create request to setup a PDU session;

obtaining the Home Control NF for the PDU session; and sending the PDU session create request to the Home Control NF, wherein obtaining the Home Control NF comprises sending, by the Roaming Control NF, to the H-NRF a discovery message comprising an RVAS Identifier RVAS-ID) of an RVAS operator of the HPLMN for discovering a Home Session Management Function (H-SMF); and wherein the method further comprises:

at the H-NRF:

determining, based on an RVAS-ID of an RVAS operator of the HPLMN, the Home Control NF; and returning the Home Control NF to the Roaming Control NF.

2. The method of claim 1, further comprising:

at the H-NRF:

sending, to the Roaming Control NF, a notification comprising an address of the selected Home Control NF; and at the Roaming Control NF:

storing the address of the Home Control NF.

3. The method of claim 2, wherein obtaining the Home Control NF is based on the stored address of the Home Control NF.

* * * * *